United States Patent [19]

Thomasson et al.

[11] Patent Number: 5,613,320
[45] Date of Patent: Mar. 25, 1997

[54] SELF-SUPPORTING THERMALLY-PROTECTIVE PLANT ENCLOSURE FORMED BY SELF-STANDING CONTAINER BODIES

[75] Inventors: Joseph R. Thomasson, Hays; John Van Dyke, Plainville, both of Kans.

[73] Assignee: Phytae, Inc., Hays, Kans.

[21] Appl. No.: 621,071

[22] Filed: Mar. 22, 1996

Related U.S. Application Data

[60] Division of Ser. No. 293,693, Aug. 19, 1994, Pat. No. 5,509,229, which is a continuation-in-part of Ser. No. 163,948, Dec. 8, 1993, abandoned.

[51] Int. Cl.⁶ .............................. A01G 13/00; A47G 7/08
[52] U.S. Cl. ......................... 47/32.1; 47/21; 47/30
[58] Field of Search ..................... 47/21, 300 T, 17 MD, 47/28.1 C, 21 A, 32.1 R

[56] References Cited

U.S. PATENT DOCUMENTS 5,509,229  4/1996  Thomasson et al. .................. 47/21

FOREIGN PATENT DOCUMENTS 2399795  4/1979  France .............................. 47/66 MD
3191723  8/1991  Japan ............................... 47/17 MD Primary Examiner—Terry Lee Melius
Assistant Examiner—Joanne C. Downs
Attorney, Agent, or Firm—John R. Flanagan

[57] ABSTRACT

A self-supporting thermally-protective plant enclosure includes a plurality of elongated hollow closure bodies each having a pair of outer and inner transparent walls. Each outer and inner wall are peripherally interconnected by a base, a top and a pair of opposite sides extending upwardly from the base to the top. Each closure body is closed along the opposite sides and base and is open at least through a portion of the top, defining an internal cavity in the closure body capable of receiving and holding a quantity of fluid therein. The closure bodies are positioned in side-by-side relation and are coupled one closure body to the next along the opposite sides thereof so as to form the plant enclosure with an open top and bottom and an annular configuration surrounding a protective plant growth chamber. The plant enclosure also includes features for releasably coupling the closure bodies together along adjacent pairs of opposite sides of closure bodies so as to permit opening and closing of the plant enclosure at the opposite sides of the closure bodies of the plant enclosure. In a first embodiment, the container bodies are a plurality of bags. In a second embodiment, the container bodies are a plurality of hollow arcuate-shaped modules which fit together to form the plant enclosure.

15 Claims, 3 Drawing Sheets

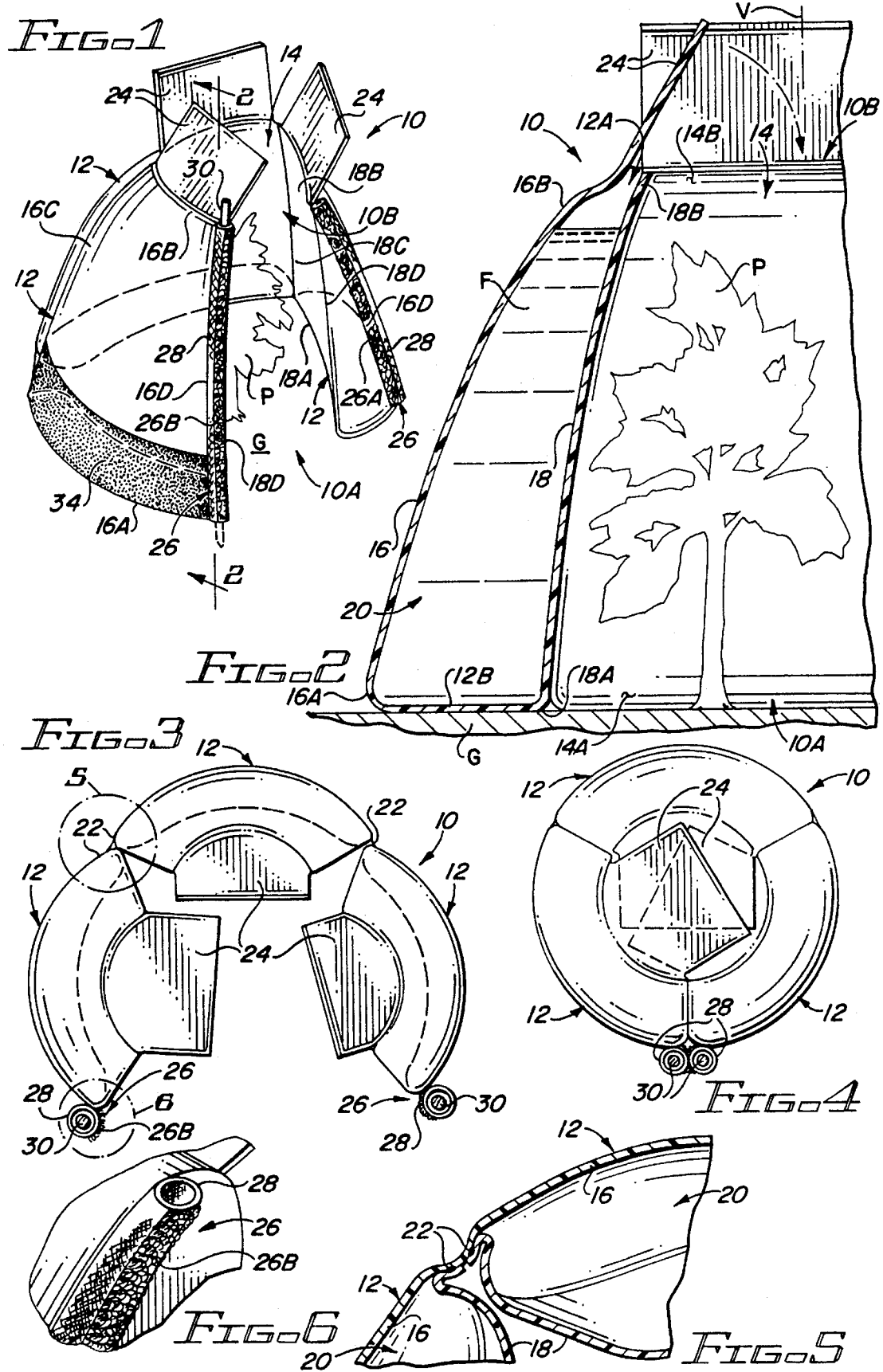

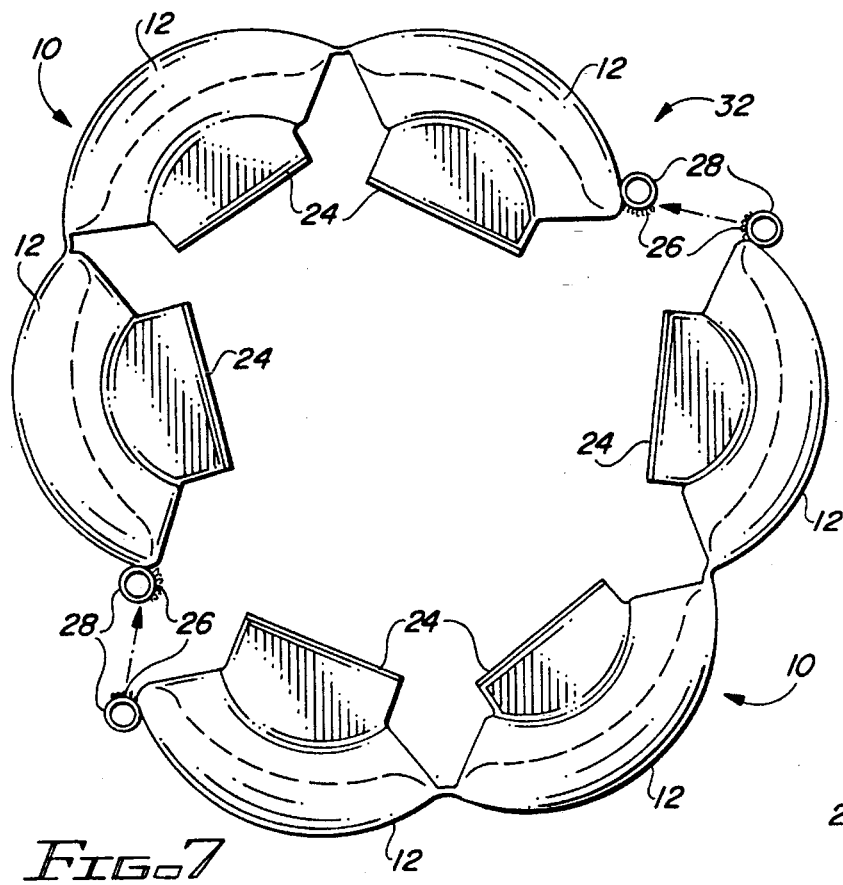
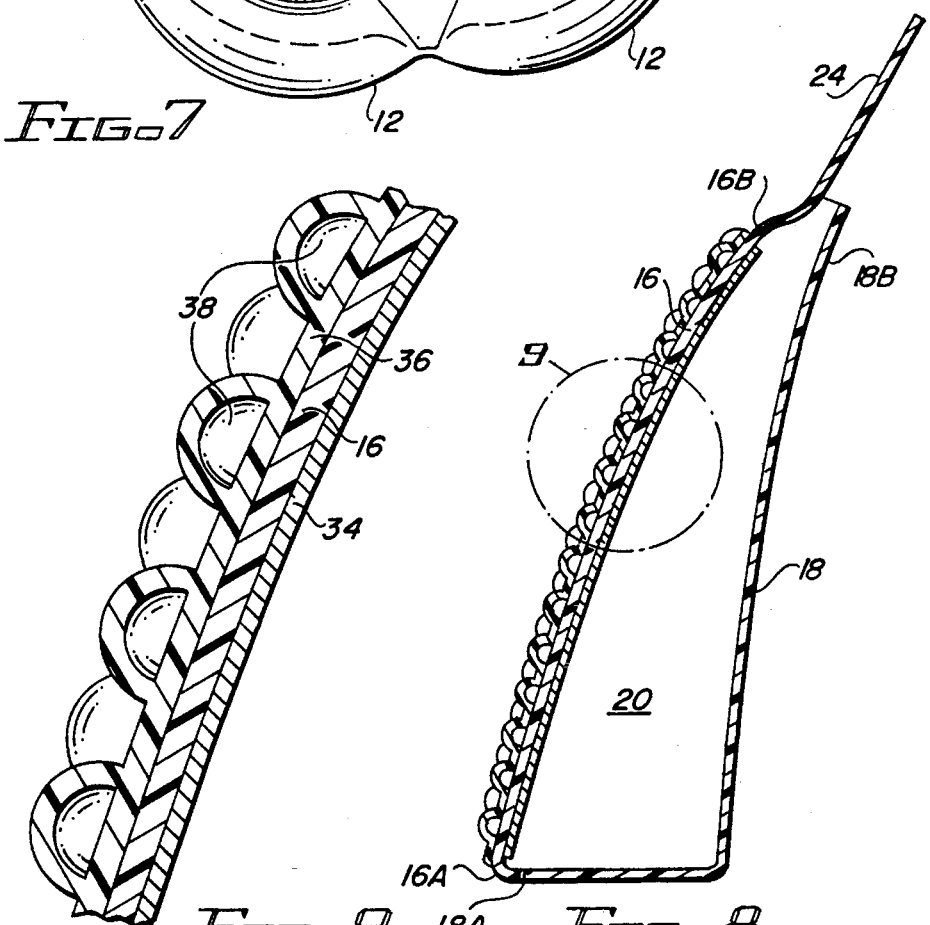

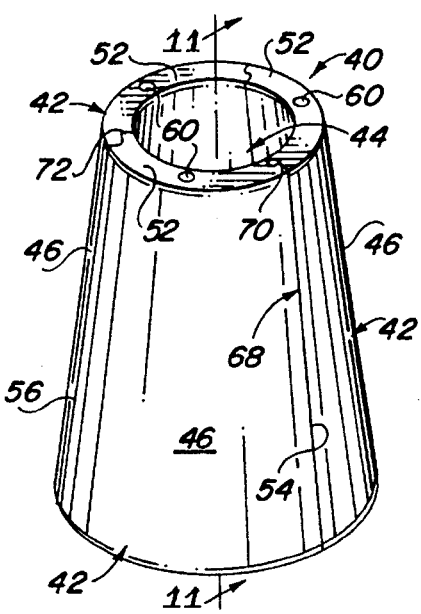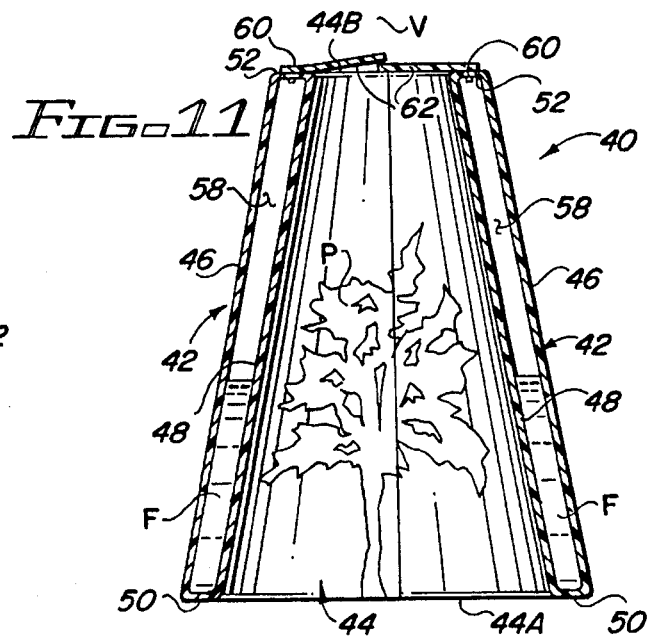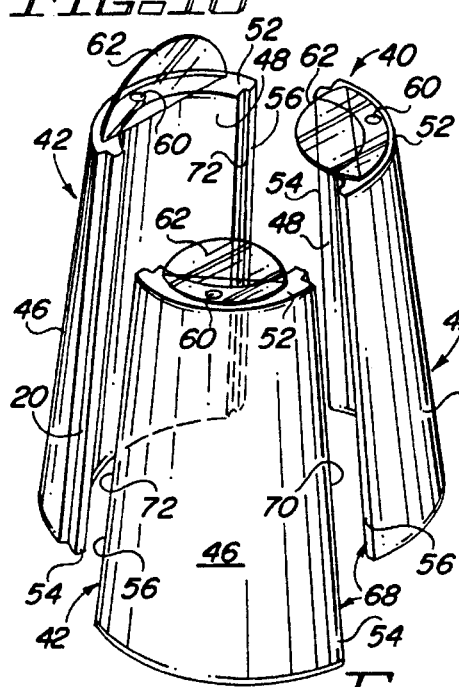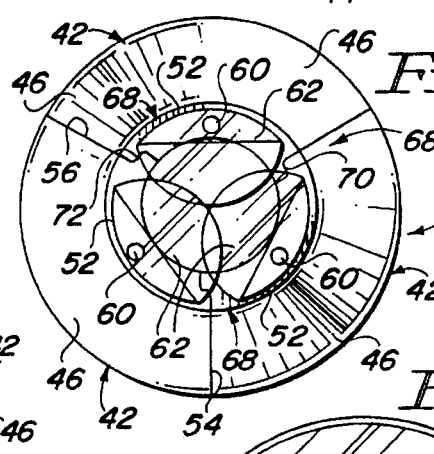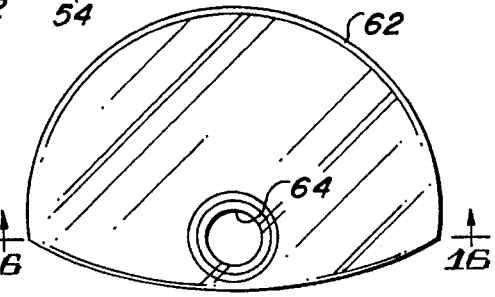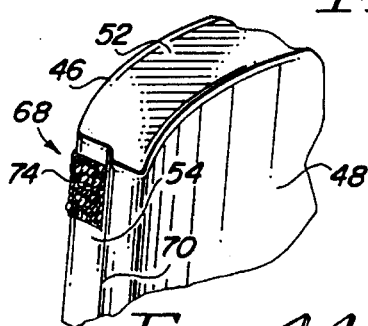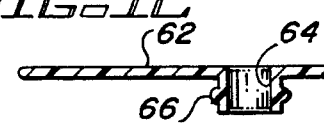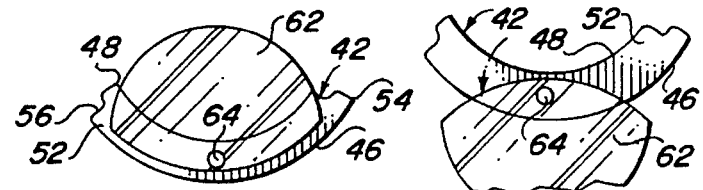

SELF-SUPPORTING THERMALLY-PROTECTIVE PLANT ENCLOSURE FORMED BY SELF-STANDING CONTAINER BODIES

CROSS-REFERENCE TO RELATED APPLICATION

This application is a division of Ser. No. 293,693, filed Aug. 19, 1994, now U.S. Pat. No. 5,509,229, which is a continuation-in-part of U.S. application Ser. No. 08/163,948, filed Dec. 8, 1993, abandoned.

BACKGROUND OF THE INVENTION

1. Field of the Invention

The present invention generally relates to enclosure structures for protecting plants and, more particularly, is concerned with a self-supporting thermally-protective plant enclosure formed by a plurality of self-standing container bodies.

2. Description of the Prior Art

Members of the plant kingdom are sensitive to the environment in which they are grown. Members of this group include herbaceous and woody, annual, biennial, and perennial plants whose bulbs, flower parts, fruit, leaves, roots, seeds, stems, or tubers are used as food or for ornamental purposes. As used herein, the word "plant" will refer to all plants, even though the effects of adverse environment (e.g., climatic conditions or changes) on different types of plants may vary. Plants grown either in home gardens or in commercial fields which are used for food or ornament are referred to as the "crop".

Crops are produced commercially all over the world. More and more types of crops are transported over vast distances for sale in high volume in diverse markets. This global competition makes it essential to maximize the productivity of each individual plant which is grown to produce a crop, and to increase the duration of the growing season despite adverse climatic conditions.

Efforts to achieve these goals include building large structures, such as greenhouses, in which a controlled environment is maintained using artificial heat sources, for example. However, the use of such greenhouses is limited by the relatively high capital investment required for construction and provision of the equipment.

Efforts to provide a lower-cost, yet somewhat protective, environment for plants without using such greenhouse structures are illustrated by the devices disclosed in the prior patent art. Representative of such prior art are patents to Fry (U.K. Pat. No. 1,144,366), Morehead (U.S. Pat. No. 4,821,453) and Wallace et al (U.S. Pat. Nos. 4,137,667 and 4,267,665).

The Fry patent (U.K. Pat. No. 1,144,366) discloses a device for protecting a plant growth area which includes a plurality (three) translucent bags fused together and partially filled with water and apparently closed individually at their respective top ends to form three sides of a rough tetrahedron. The Fry device also includes a rigid inverted cup-shaped support cover which rests on the ground over and spaced by a layer of air from the plant growth area. The support cover supports the bags internally thereof such that the bags provide a layer of water over the small plant growth area. The rigid support also permits the passage of light to the small plant growth area.

The Morehead patent (U.S. Pat. No. 4,821,453) discloses a plant protector device which includes spaced outer and inner truncated-conical shaped hollow rigid continuous side walls and annular top and bottom end walls extending between and interconnecting the side walls. A top closure is provided to cap an opening through the top wall for supplying fluid into the hollow interior of the device defined between the side walls. The plant protector device is open at its top and bottom and is adapted to be placed over a seedling plant.

The first Wallace et al patent (U.S. Pat. No. 4,137,667) discloses a device for providing a protective covering for a growing plant which includes a bag holding water and being gathered and tied together by a tie at top and bottom portions to define an invaginated opening extending vertically upwardly from the bottom of the bag. This Wallace et al device also includes an inverted cup-shaped protective cover inside of and overlaid by the bag and disposed in the invaginated opening thereof. The cover rests on the ground and extends over the plant.

The second Wallace et al patent (U.S. Pat. No. 4,267,665) discloses a thermal protective covering for a plant which includes a double-walled structure having outer and inner walls being connected together along vertical lines spaced from one another about the circumference of the structure to define separate compartments between the walls. The walls are joined at the horizontally spaced vertical lines by heat sealing, adhesives, etc. The vertical lines are discontinuous to provide interconnections between the adjacent compartments to permit flow communication from one compartment to the next. The walls are closed at the bottom but open at the top to permit inflation by water added to the compartments. The top can be closed by a tie. Also, if desired the compartments can be non-communicating with one another and separately filled with water. Alternatively, the thermally protective cover could be constructed from a plurality of separately formed, non-fluid communicating sections. These sections could be formed as annular rings, elongated tubes or other configurations that could be fitted together to form a plant enclosure. The elongated tubes could be arranged side-by-side to enclose a growing area. This multi-tube device of the second Wallace patent is substantially similar to a plant covering device being marketed currently under the trademark Wall-O-Water.

The above-described prior art protective cover devices may likely constitute a small step in the right direction toward some improvement in functioning as a protective thermal environment for early plant growth. However, these prior art devices do embody a number of drawbacks such that none of the devices appears to provide an effective and viable configuration for satisfactory performance of such function. First, these prior art devices are or can only be opened at the top and so are incapable of allowing sufficient sunlight directly onto the plant and of releasing the humidity from around the plant to the external environment. The lack of sufficient direct sunlight and the overload of humidity produce plant growth lacking in strength. Second, some of the devices have to be completely removed from over the plant to have adequate access to the plant to practically apply side-dressed fertilizers. Third, because none of the prior art devices can be opened from the sides, applying pesticides to the undersides of leaves where most pests are found cannot be accomplished unless the devices are removed from the plant. Similarly, the application of side-dressed, granular fertilizers cannot be effectively accomplished without removing the prior art devices. Fourth, the second Wallace et al device which has the multiple tubes requires the filling of many small vertical tubes, a process that is tedious and time-consuming. Fifth, the prior art devices which are or can be opened only at the top are likely to cause damage to a plant when the device is pulled over the plant since it is likely that the plant is protruding through the open top of the device. Sixth, the high degree of flexibility of some of these prior art devices makes them unstable and difficult to handle and transport when either empty or full of water. The second Wallace et al patent cannot be used in a self-supporting configuration unless filled with a liquid.

Consequently, a need still exists for a plant enclosure which will avoid the drawbacks of the prior art devices and provide an effective protective thermal environment for early plant growth.

SUMMARY OF THE INVENTION

The present invention provides a self-supporting thermally-protective plant enclosure formed of plural self-standing container bodies designed to satisfy the aforementioned need. The structure of the plant enclosure of the present invention protects a plant from adverse environmental factors, such as wind and frost, and concurrently supplies the plant with a beneficial thermal environment which tends to promote growth.

In contrast to the prior art protective cover devices described above, the plant enclosure of the present invention can be fully opened from the tops and at least some of the sides thereof and thus will easily allow full sunlight onto the plant and a reduction in humidity, even as the plural container modules of the plant enclosure continues to afford wind and cold protection. As a results, a plant grown in the plant enclosure of the present invention will be stronger than one grown in the aforementioned commercial device. Also, because the plant enclosure of the present invention can be fully opened from the side, pesticides needed to maintain plant health can be readily and adequately applied to all surfaces of the plant. Similarly, side-dressed, granular fertilizer can be readily applied around the base of the plant. Additionally, the plant enclosure of the present invention can be filled much faster and easier because of the few large size container bodies employed and the semi-rigid and self-standing properties of the plural container bodies which make the plant enclosure substantially self-supporting when empty. Further, because of the semi-rigid property of the plural container bodies, the plant enclosure of the present invention is easier to transport either full or empty and permits such handling to be carried out mechanically as opposed to manually.

Accordingly, the present invention is directed to a plant enclosure which comprises: (a) a plurality of elongated hollow container bodies each having a pair of outer and inner transparent walls, the outer and inner walls being spaced apart and peripherally connected by walls defining a base, a top and a pair of opposite sides extending upwardly from the base to the top, each of the container bodies being closed along the opposite sides and the base and open through at least a portion of the top to define an internal cavity in the container body capable of receiving and holding a quantity of fluid therein, the container bodies being positioned in side-by-side relation and at least some of said container bodies being coupled one body to the next along the opposite sides thereof so as to form the plant enclosure with an open top and bottom and a generally annular configuration surrounding a protective plant growth chamber; and (b) means for releasably coupling at least a pair of the container bodies of the plurality thereof together along a pair of the opposite sides thereof being adjacent to one another so as to permit opening and closing of the plant enclosure at the pair of opposite sides of the pair of bodies of the plant enclosure.

More particularly, in a first embodiment, each container body is in the form of a bag. Each of the outer and inner walls of each of the bags has a perimeter defining a generally trapezoidal shape and includes the base, top and pair of opposite sides extending upwardly from the base to an apex defined at the top. Each bag is closed along the opposite sides and base and open at the top apex to define the internal cavity with a generally trapezoidal shape capable of receiving and holding the quantity of fluid therein.

Also, outer and inner walls of each bag may be fabricated of respective materials differing in rigidity and flexibility properties such that one of the outer and inner walls is substantially more rigid and less flexible than the other of the outer and inner walls so as to provide each of the individual bags as a self-standing body and the plant enclosure as a self-supported structure either with or without the presence of fluid in the internal cavity of each of the bags thereof. Furthermore, one of the outer and inner walls of each bag has a greater height than the other of the outer and inner walls such that an upper portion of the one wall extends beyond the top of the other wall so as to define a flap which can extend inwardly toward a central vertical axis of the plant enclosure and substantially cover the top of the plant enclosure.

The coupling means attached along the adjacent sides of the pair of opposite sides of the one pair of bags are strips of hook and loop fastening material. Also, the pair of opposite sides of the pair of bags have respective sleeves attached therealong and an elongated stake is insertable through each of the sleeves and into the ground for anchoring and holding the respective bags and thereby the plant enclosure in place.

In a second embodiment, the container bodies are longitudinal hollow arcuate-shaped modules which fit together to form of a complete enclosure having a truncated-conical configuration. Each of the outer and inner walls of each of the modules has a curved perimeter defining a generally trapezoidal shape. The outer and inner walls of each module are spaced from one another and interconnected about their peripheral edges by a plurality of walls defining the base, top and pair of opposite sides of the module. Thus, each hollow module is closed about its base, top and pair of opposite sides so as to define an internal cavity with a generally trapezoidal shape capable of holding a quantity of fluid therein and is open at a centrally-located hole in the top wall of the module for receiving the quantity of fluid therein. Also, the walls of each of the modules of the plant enclosure of the second embodiment are fabricated of respective materials of sufficient rigidity so that the modules provide plural self-standing bodies and the plant enclosure provides a self-supporting structure either with or without the presence of fluid in the internal cavities thereof.

Furthermore, modules of the enclosure of the second embodiment have pivotally hinged or rotatable flaps on the top walls thereof adjacent to the holes therein which can be pivoted or rotated relative to the module to extend inwardly toward a central vertical axis of the plant enclosure and substantially cover the top of the plant enclosure.

The coupling means of the second embodiment of the plant enclosure are preferably in the form of mating or interfitting curved surfaces defined on the side walls extending along the adjacent pairs of opposite sides of the modules. As one preferred configuration, the curved surfaces are generally S-shaped in cross section. Also, the coupling means can be patches of hook and loop fastening material attached to portions of the side walls.

Further, selected ones of the container bodies of both embodiments can have means, such as surface regions painted black, extending along and at least a short distance above the bases of the outer walls thereof and in heat transfer relationship therewith for receiving and absorbing thermal energy from the outside environment. Also, on selected ones of the container bodies the thermal energy-absorbing means can extend coextensive with and in heat transfer relation with the outer walls for receiving and absorbing the thermal energy transmitted through the plant enclosure.

Finally, the plant enclosure can also include an outer layer of flexible material containing a plurality of sealed hollow pockets containing air. The outer layer of flexible material is attached to the exterior of the outer walls of the container bodies for reducing the rate of conductive heat transfer to and from the plant enclosure through the bodies.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a first embodiment of a self-supporting thermally-protective plant enclosure constructed in accordance with the present invention and shown in an opened condition surrounding a plant.

FIG. 2 is an enlarged vertical sectional view of the plant enclosure taken along line 2—2 of FIG. 1.

FIG. 3 is a top plan view of the plant enclosure in the opened condition.

FIG. 4 is a top plan view of the plant enclosure in a closed condition,

FIG. 5 is an enlarged detailed sectional view of the portion of the plant enclosure encompassed by circle of FIG. 3.

FIG. 6 is an enlarged detailed view of the portion of the plant enclosure encompassed by circle 6 of FIG. 3.

FIG. 7 is a top plan view showing how a pair of the plant enclosures of FIG. 3 can be attached together to form an expanded plant enclosure having a larger diameter.

FIG. 8 is an enlarged vertical sectional view of a modified form of one of the bags of the plant enclosure.

FIG. 9 is an enlarged detailed view of the portion of the plant enclosure bag encompassed by circle 9 of FIG. 8.

FIG. 10 is a perspective view of a second embodiment of a self-supporting thermally-protective plant enclosure constructed in accordance with the present invention and shown in a closed condition.

FIG. 11 is an enlarged vertical sectional view of the plant enclosure taken along line 11—11 of FIG. 10, showing one form of a plurality of closures disposed on the top of the plant enclosure.

FIG. 12 is a perspective view of the plant enclosure in an opened and uncoupled condition.

FIG. 13 is an enlarged top plan view of the plant enclosure in a closed condition surrounding a plant.

FIG. 14 is an enlarged fragmentary perspective view of a top edge portion of one of the container modules of the plant enclosure of FIG. 12.

FIG. 15 is an enlarged plan view of another form of a closure disposed on the top of the plant enclosure.

FIG. 16 is a sectional view of the closure taken along line 16—16 of FIG. 15.

FIG. 17A is a top plan view of the closure of FIG. 15 being shown in a closed condition.

FIG. 17B is a top plan view of the closure of FIG. 15 being shown in an opened condition.

DETAILED DESCRIPTION OF THE INVENTION

Referring to the drawings, and particularly to FIGS. 1 and 2, there is illustrated a first embodiment of a self-supporting thermally-protective plant enclosure of the present invention, being generally designated 10. The first embodiment of the plant enclosure 10 basically includes a plurality of elongated hollow container bodies in the form of a plurality of bags 12, preferably being at least three in number, positioned in side-by-side self-standing relation and are coupled one bag to the next. The plant enclosure 10 is formed with an overall annular-shaped configuration in which it surrounds a plant P and defines a protected growth chamber 14 for the plant P extending above the ground G around the plant P. The growth chamber 14 is open at opposite bottom and top ends 14A, 14B, as can be readily seen in FIG. 2.

Referring to FIGS. 1, 2 and 5, each bag 12 of the plant enclosure 10 has a pair of outer and inner transparent walls 16, 18. Each wall 16, 18 has a base 16A, 18A, a top 16B, 18B and a pair of opposite vertical sides 16C, 16D and 18C, 18D extending upwardly from the base 16A, 18A to the top 16B, 18B. Each bag 12 is closed along the opposite vertical sides 16C, 16D and 18C, 18D and the base 16A, 18A and is open along the top 16B, 18B of the outer and inner walls 16, 18 so as to define an internal compartment or cavity 20 in the bag 12 between the outer and inner walls 16, 18 thereof. The internal cavities 20 of the respective bags 12 are separate from one another. As seen in FIG. 2, each internal cavity 20 is capable of receiving and holding its own quantity of fluid F, such as ordinary water, therein. The fluid is received through an open top 12A of the bag 12 defined between the tops 16B, 18B of the outer and inner walls 16, 18.

More particularly, each of the outer and inner walls 16, 18 of each bag 12 has a perimeter defining a generally trapezoidal shape wherein the base 16A, 18A is wider than the top 16B, 18B and the pair of opposite sides 16C, 16D and 18C, 18D, having substantially the same heights, converge upwardly toward one another to define an apex at the top 16B, 18B. The internal cavity 20 of each bag 12 thus has a generally trapezoidal shape also. Shapes other than trapezoidal are possible and within the purview of the present invention.

The outer wall 16 of each bag 12 can be fabricated of a material which is more rigid and less flexible than the inner wall 18, or vice versa, so as to provide each bag 12 as a self-standing body and the plant enclosure as a self-supported structure either with or without the presence of fluid in the internal cavities 20 of the bags 12. As an example, as depicted in FIG. 5, the outer walls 16 of the bags 12 may be formed by a single long sheet of material, whereas the inner walls 18 of the bags 12 may be formed by individual shorter sheets of material which are bonded or fused by vertical joints 22 to the single long sheet providing the outer walls 16. Again, just the opposite arrangement can be employed wherein the inner walls 18 are formed by the single long sheet of material and the outer walls 16 are formed by individual shorter sheets bonded thereon. Alternatively, the outer walls 16 and the inner walls 18 of the bags 12 may be made from individual sheets of material which are bonded by vertical joints 22. The individual bags 12 thus formed may be adjacently bonded or fused by additional vertical joints located between the joints 22. The outer and inner walls 16, 18 are preferably fabricated from a suitable light transparent plastic material.

As best seen in FIG. 2, when each bag 12 is filled with fluid, the less rigid and more flexible one of the inner or outer wall 18, 16 deforms or sags to define a closed bottom 12B on the bag 12, as seen in FIGS. 1 and 2, which rests upon the ground G. The bags 12 together thus provide the plant enclosure 10 with the annular configuration and opposing open bottom and top 10A, 10B which respectively define the opposite open bottom and top ends 14A, 14B of the protective growth chamber 14, with the open bottom end 14A being substantially larger in diameter than the open top end 14B.

Referring to FIGS. 1 to 4, it is seen that the outer wall 16 of each bag 12 has a greater height than the inner wall 18 thereof such that an upper portion of outer wall 16 extends beyond the top 18B of the inner wall 18 so as to define a top flap 24. The top flap 24 of each bag 12 extends inwardly toward a central vertical axis V of the plant enclosure 10 and together the top flaps 24 will substantially cover the open top 10B of the plant enclosure 10, in a manner best shown in FIG. 4.

Referring to FIGS. 1, 3, 4 and 6, the plant enclosure 10 of the first embodiment further includes means 26 for releasably coupling at least a pair of the bags 12 and permanently coupling other of the bags 12 together along adjacent pairs of opposite sides thereof so as to permit opening and closing of the plant enclosure 10 at the side thereof as well as being open at the top 10B. As examples, the coupling means 26 are strips 26A, 26B of hook and loop fastening material attached along the adjacent sides of the pair of bags 12. Releasable coupling means having alternative configurations and constructions can also be utilized. The plant enclosure 10 further preferably includes a hollow tube or sleeve 28 attached along each of the adjacent sides of the pair of bags 12 and an elongated stake 30 insertable through each of the sleeves 28 and into the ground G, as seen best in FIG. 1, for anchoring and holding the respective bags 12 and thereby the plant enclosure 10 in place against the force of wind gusts. Also, as seen in FIG. 7, one or more the bags 12 can be attached together to form an expanded plant enclosure 32 having larger diameter sizes to accommodate plants of differing sizes.

As seen in FIGS. 1 and 8, to improve utilization of thermal energy selected ones of bags 12 can have means, such as surface regions 34 painted black or with black sheets attached, extending along and at least a short distance above the bases 16A of the outer walls 16 thereof and in heat transfer relationship therewith for receiving and absorbing thermal energy from the outside environment. Also, on selected ones of the bags 12 the thermal energy-absorbing means can be coextensive with and in heat transfer relation with the outer walls 16 for receiving and absorbing the thermal energy being transmitted through the plant enclosure 10. The heat absorbing blackened regions 34 cause convection currents to be set up in the internal cavities 20 to promote faster melting of any ice which has formed in the water overnight, the goal being to melt all ice each day. Also, the full-height heat absorbing blackened regions 34 collect thermal energy from sun rays which have already passed through one transparent side of the plant enclosure 10.

Referring to FIGS. 8 and 9, the plant enclosure 10 can also include an outer layer 36 of flexible material having a plurality of sealed hollow pockets 38 containing air. The outer layer 36 of flexible material, also commercially known as "bubble wrap" is attached to the exterior of the outer walls 16 of the bags 12 for reducing the rate of conductive heat transfer through the bags 12 to and from the plant enclosure 10. Preferably, the outer bubble layer 36 is applied to the full-height of the outer walls 16.

Referring to FIGS. 10–13, there is illustrated a second embodiment of the self-supporting thermally-protective plant enclosure of the present invention, being generally designated 40. The second embodiment of the plant enclosure 40 basically includes a plurality of elongated hollow container bodies in the form of longitudinal hollow arcuate-shaped modules 42. The modules 42 can be made in other shapes. The plurality of hollow modules 42, preferably being at least three in number, are positioned in side-by-side self-standing relation and fit together to form of a complete enclosure having a truncated-conical configuration. Thus, as can be readily seen in FIG. 11, the plant enclosure 40 is formed with an overall annular-shaped configuration in which it surrounds a plant P and defines a protected growth chamber 44 for the plant P extending above the ground G around the plant P. The growth chamber 44 is open at opposite bottom and top ends 44A, 44B.

Referring still to FIGS. 10–13, each hollow container module of the plant enclosure 40 has a pair of outer and inner transparent walls 46, 48 spaced from one another and interconnected about their peripheral edges by a plurality of walls defining a base 50, top 52 and a pair of opposite vertical sides 54, 56 of each hollow module 42. Each of the outer and inner walls 46, 48 of the modules 42 has a curved perimeter defining a generally trapezoidal shape. Each hollow container module 42 is closed about its base 50, top 52 and pair of opposite vertical sides 54, 56 so as to define an internal compartment or cavity 58. The internal cavities 58 of the respective modules 42 are separate from one another. As seen in FIG. 11, each internal cavity 58 is capable of receiving and holding its own quantity of fluid F, such as ordinary water, therein. The fluid is received through a centrally-located hole 60 defined in the top 52 of the respective module 42.

Also, the walls of each of the modules 42 of the plant enclosure 40 are fabricated of respective materials of sufficient rigidity so that the modules 42 provide plural self-standing bodies and the plant enclosure 40 provides a self-supporting structure either with or without the presence of fluid in the internal cavities 58 thereof.

Furthermore, in one form seen in FIGS. 11–13, the hollow container modules 42 of the plant enclosure 40 have arcuate-shaped flaps 62 hingedly attached on the top walls 52 thereof adjacent to the holes 60 therein which can be pivoted relative to the module 42 to extend inwardly toward a central vertical axis V of the plant enclosure 40 and substantially cover the open top thereof. In another form seen in FIGS. 15, 16, 17A and 17B, each of the flaps 62 has an aperture 64 defined therethrough and an annular-shaped snap fit connection 66 integrally formed on an underside of the flap about the aperture 64 which can be forced into the top hole 60 in the top wall 52 of each of the modules 42. In such manner the flap 62 is mounted to the module 42 so as to be able to undergo rotational movement between closed and opened conditions as seen respectively in FIGS. 17A and 17B.

Referring again to FIGS. 10–13, the plant enclosure 40 of the second embodiment further includes means 68 for releasably coupling the hollow container modules 42 to one another. The coupling means 68 preferably take the form of mating or interfitting curved surfaces 70, 72 defined on the side walls 54, 56 that extending along the adjacent pairs of opposite sides of the modules 42. As one preferred configuration, the curved surfaces 70, 72 are generally S-shaped in cross section. Also, as seen in FIG. 14, the coupling means 68 can also include patches 74 of hook and loop fastening material attached to upper portions of the side walls 54, 56 to assist in keeping the modules 42 interfitted together under windy conditions. Further, to improve utilization of thermal energy, selected ones of modules 42 of the second embodiment of the plant enclosure 40 can be painted black or provided with black sheets attached thereto the same as in the case of the bags 12 of the first embodiment. Also, similar to the case of the first embodiment, a layer of flexible "bubble wrap" material can be attached to the exterior of the outer walls 46 of the modules 42 for reducing the rate of conductive heat transfer through the modules 42 to and from the plant enclosure 40.

In conclusion, the self-supporting thermally-protective plant enclosures 10, 40 of the present invention by having the above-described construction thereby satisfies the need for an effective protective cover device in which: (1) the thermal efficiency is substantially increased such that the plant growing season can be started or extended during cooler periods when it would not otherwise be possible to begin or extend growth without the plant enclosure 10, 40; (2) the internal environment of the protected growth chamber is easily accessable both from the side and top of the plant enclosure 10, 40 during the growing season without removing the plant enclosure 10, 40 entirely from the plant P; (3) the structure of the plant enclosure 10, 40 permits setting up large numbers for commercial plant growing operations or otherwise less time-consuming than currently available devices, (4) the structure of the plant enclosure 10, 40 makes it easier to remove the plant enclosure 10, 40 from the plant P when its protective features are no longer needed without causing any damage to the plant P; (5) the structure of the plant enclosure 10, 40 permits the device to be setup to allow exposure of the plant P to direct, unfiltered sunlight while still protecting the plant P from adverse affects of the environment, such as wind; and (6) the structure of the second embodiment of the plant enclosure 40 allows each module 42 to be used independently for protection of plants from adverse environmental conditions, such as wind.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A protective plant enclosure, comprising:
    (a) a plurality of elongated hollow container bodies each having an outer and an inner transparent wall, said outer and inner walls being spaced apart and peripherally interconnected by a plurality of walls defining a base, a top and a pair of opposite sides extending upwardly from said base to said top, each of said container bodies being closed along said opposite sides and said base and open through at least a portion of said top to define an internal cavity in said container body capable of receiving and holding a quantity of fluid therein, said container bodies being positioned in side-by-side relation and at least some of said container bodies being coupled one body to the next along said opposite sides thereof so as to form said plant enclosure with an open top and bottom and a generally annular configuration surrounding a protective plant growth chamber; and
    (b) selected ones of said container bodies of said plurality thereof having means extending along and at least a short distance above said bases of the outer walls thereof and in heat transfer relationship therewith for receiving and absorbing thermal energy from the outside environment.

2. The enclosure of claim 1 wherein said thermal energy absorbing means extends coextensive with and in heat transfer relation with said outer walls of selected ones of said container bodies for receiving thermal energy transmitted through said plant enclosure.

3. The enclosure of claim 1 further comprising:
    means for releasably coupling at least a pair of said container bodies of said plurality thereof together along adjacent pairs of said opposite sides thereof so as to permit opening and closing of said plant enclosure at said pairs of opposite sides of said container bodies of said plant enclosure.

4. The enclosure of claim 1 wherein said plurality of container bodies are at least three in number.

5. The enclosure of claim 1 wherein said container bodies are a plurality of bags.

6. The enclosure of claim 5 wherein each of said bags has a trapezoidal configuration.

7. The enclosure of claim 1 wherein said container bodies are longitudinal hollow arcuate-shaped modules which fit together to form an annular enclosure.

8. The enclosure of claim 7 wherein each of said modules has a curved perimeter defining a generally trapezoidal shape which provides said enclosure with a truncated frustoconical configuration.

9. A protective plant enclosure, comprising:
    (a) a plurality of elongated hollow container bodies each having an outer and an inner transparent wall, said outer and inner walls being spaced apart and peripherally interconnected by a plurality of walls defining a base, a top and a pair of opposite sides extending upwardly from said base to said top, each of said container bodies being closed along said opposite sides and said base and open through at least a portion of said top to define an internal cavity in said container body capable of receiving and holding a quantity of fluid therein, said container bodies being positioned in side-by-side relation and at least some of said container bodies being coupled one body to the next along said opposite sides thereof so as to form said plant enclosure with an open top and bottom and a generally annular configuration surrounding a protective plant growth chamber; and
    (b) an outer layer of flexible material containing a plurality of sealed hollow pockets containing a gas therein, said outer layer being attached to the exterior of said outer walls of selected ones of said container bodies for reducing the rate of conductive heat transfer to and from said plant enclosure through said container bodies.

10. The enclosure of claim 9 further comprising:

means for releasably coupling at least a pair of said container bodies of said plurality thereof together along adjacent pairs of said opposite sides thereof so as to permit opening and closing of said plant enclosure at said pairs of opposite sides of said container bodies of said plant enclosure.

11. The enclosure of claim 9 wherein said container bodies are a plurality of bags.

12. The enclosure of claim 11 wherein each of said bags has a trapezoidal configuration.

13. The enclosure of claim 9 wherein said container bodies are longitudinal hollow arcuate-shaped modules which fit together to form an annular enclosure.

14. The enclosure of claim 13 wherein each of said modules has a curved perimeter defining a generally trapezoidal shape which provides said enclosure with a truncated frustoconical configuration.

15. The enclosure of claim 9 wherein said plurality of bags are at least three in number.

* * * * *